Figure 1:
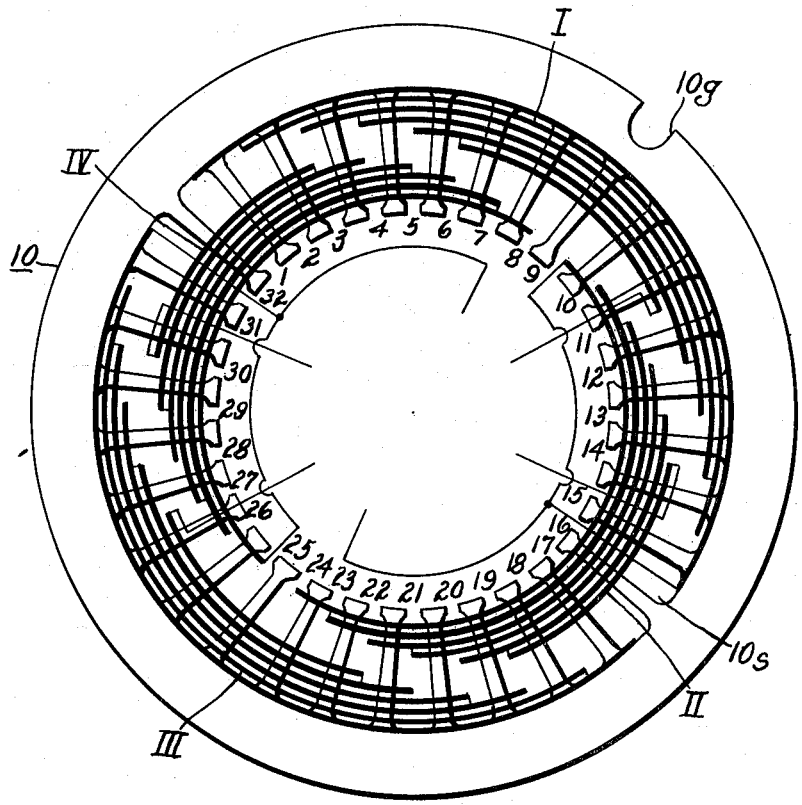

Jan. 11, 1966  G. A. NEYHOUSE ETAL  3,229,180
SINGLE-PHASE MOTOR AND OPERATING METHOD
Filed July 16, 1962

INVENTORS
GEORGE A. NEYHOUSE
JACK W. SAVAGE
RALPH K. SHEWMON
BY Albert H. Reuther
ATTORNEY United States Patent Office 3,229,180
Patented Jan. 11, 1966

3,229,180
SINGLE-PHASE MOTOR AND
OPERATING METHOD
George A. Neyhouse, Dayton, and Jack W. Savage and Ralph K. Shewmon, Centerville, Ohio, assignors to General Motors Corporation, Detroit, Mich., a corporation of Delaware
Filed July 16, 1962, Ser. No. 210,258
3 Claims. (Cl. 318—221)

This disclosure is based upon one embodiment of several embodiments that form part of original application Ser. No. 804,223, Neyhouse et al., filed April 6, 1959, now abandoned though copending herewith and having at least a further embodiment thereof covered by another copending application Ser. No. 178,803, Neyhouse et al., filed March 12, 1962, now Patent 3,211,982, Neyhouse et al., dated October 12, 1965, all belonging to the assignee of the present invention. Also, reference is made to a related copending patent application Ser. No. 804,374, filed April 6, 1959, now Patent 2,989,654, Neyhouse et al., issued June 20, 1961, to the assignee of the present invention concerning additional teaching as well as coverage of operations disclosed by the same inventors as in the present invention.

This invention relates to dynamoelectric machines, and particularly, to a multi-speed motor.

An object of this invention is to provide a new and improved motor utilizing a number of individual equally-spaced wound portions collectively to form electrical poles, all being electrically connectable and energizable to be active in every mode of operation.

Another object of this invention is to provide a motor stator winding having a number of individual coil portions generally totalling the least common multiple $m$ of each of the $n$ numbers of electrical poles at which the motor is to operate, each coil portion extending an arcuate distance equal to or greater than $360°/m$ and being connectable into $n$ groups, each group consisting of $m/n$ adjacent coil portions of like polarity to effect a pole, such a system being equally usable in both single and polyphase machines.

Another object of this invention is to provide a single-phase motor having plural coil portions of a single winding connectable to form two and four electrical poles relative to a stator iron assembly and adaptable to have conducting material of the winding active at all times for operations including two pole start, two pole run and/or four pole run attainable by proper orientation of current flow through conducting material and in which selected coil portions are subjected to addition and removal of phase shifting means such as an inductance, capacitance, or resistance and capacitance for starting and running operation respectively.

A further object of this invention is to provide improvement for starting a motor having a winding of which all conducting material is always active so that for starting at minimum electrical pole ratio $n$ this number of poles $n$ can be taken to be parallel wound conductor sub-portions of coil portions but connectable in series branches whereby the turns ratio of the sub-portions of coil portions subjected to a phase shifting means is doubled for starting duty.

Another object of this invention is to provide improvement in starting a motor having a winding of which all conducting material is always active using parallel wound conductor sub-portions of coil portions for at least a portion of the motor conductors so as to permit variation of strength of power or torque of the motor by switching of electrical connections of coil portions forming the winding.

Further objects and advantages of the present invention will be apparent from the drawings wherein preferred embodiments of the present invention will be shown.

In the drawings:

FIGURE 1 is a plan view of a stator and coil assembly along with diagrammatic representation of connections relative thereto for a thirty-two slot, six lead, nonreversible series wound two-four pole dynamoelectric machine in accordance with the present invention.

Slight variation of the FIGURE 1 diagrammatic representation of connections relative to a thirty-two slot, six lead, nonreversible series wound two-four pole dynamoelectric machine can provide for a thirty-two slot, seven lead, reversible series wound two-four pole dynamoelectric machine in accordance with the present invention.

Figure 2:
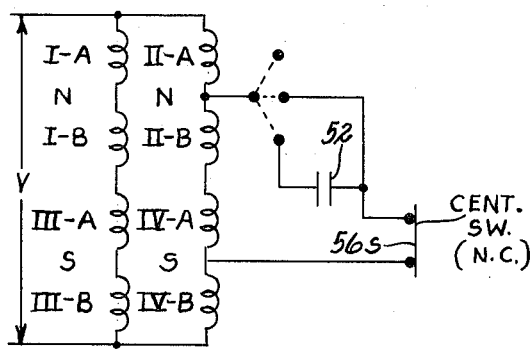

FIGURE 2 illustrates diagrammatically a control circuit for establishing running and starting connections for a dynamoelectric machine having a winding in accordance with the present invention.

A need exists in the appliance industry for a multi-speed motor or dynamoelectric machine requiring a minimum of materials which can be assembled to form a compact unit requiring less space than previously known multi-speed motors. For example, appliances such as laundry equipment and air conditioners can advantageously use a multi-speed motor. For laundry equipment such as a washing machine having a program of operation including various cycles at differing speeds, there can be a saving in time and expense in manufacture and operation of the laundry equipment. Benefits of this saving in time, labor and expense accrue to both the manufacturer and to the customer. Previous multi-speed motors have been found expensive due to a cost premium in labor and material involved in installing an auxiliary high speed winding along with a normal low speed running winding and necessary starting windings. Also, on appliances such as a washing machine there are various cycles of operation during which a motor is required to handle different loads involving differences in power and torque. However, appliance manufacturers are reluctant to use two speed motors requiring cost premium in labor and material due to installation of an auxiliary high speed winding along with a normal low speed running and starting winding. The present invention provides a new multi-speed motor having a winding relative to which tap-in leads and electrical connections are established for differing operation whereby a motor having a single inserted winding can be made to start and finally run at either two or four pole speeds.

A dynamoelectric electric machine or motor in accordance with the present invention has only one winding comprising a number of wound coil portions from which predetermined numbers of electrical poles can be formed as desired by establishing wiring connections relative to the coil portions as will be described in further detail below. The motor of the present invention can be used as a multiple speed motor without discrete first and second primary or running windings and/or without discrete first and second auxiliary or starting windings. To effect saving in cost of material and labor and also to permit multi-speed operation, a single winding is provided made up of multiple coil portions which are adapted to be connected in circuits wherein all conducting material of the single winding is active for both starting and running operation of the multi-speed motor. Each wound coil portion may consist of one or more coils mutually located either concentrically or overlapping. As illustrated in FIGURE 1, a dynamoelectric machine or motor in accordance with the present invention includes a stator generally indicated by numeral 10 having a plurality of slots 10s in alignment relative to each other as a number of sheet metal stator laminations are joined to form an assembly relative to which a plurality of wound coil portions are placed to be active or used during operation of the motor at all times so that all copper is active always.

One possible winding in accordance with the present invention and as illustrated in FIGURE 1 of the drawings designed to give two or four-pole operation includes wound coil portions such as identified by Roman numerals I, II, III and IV. Stators can be provided having differing numbers of slot into which coil portions are fitted.

In accordance with the present invention, a dynamoelectric machine is provided with a winding having individual equally-spaced wound collectively-formed poles, referred to as coil portions, numbering, per phase, a common multiple, usually the least common multiple, of each of the "n" number of poles at which the motor is to operate electrically which can be referred to by a letter "m." For optimum operation of a poly-speed induction motor wherein all stator conductor material is active for every mode of operation, it has been found that each coil portion of a winding in accordance with the present invention should span or subtend a 360°/m arc. For optimum single-phase starting operation, each coil portion should subtend an arc greater than 360°/m. The coil portions of a single winding fitted relative to a stator must be connected for operation as an "n"-pole motor by dividing the coil portions, per phase, into n groups, each group consisting of m/n adjacent like polarity coil portions. Starting of single-phase motors is accomplished by establishing phase-shift relationship in a portion of the winding. For example, starting can be accomplished by connecting the phase-shifting means such as a capacitance relative to a series combination of right-hand coil portions of each group. For m-pole starting, phase-shift can be effected by using fractional coil portions. Operation is feasible at any number of poles which is an even integral factor of m and at 2m poles by consequent pole connection of all coil portions. Thus, a multi-speed motor in accordance with the present invention can be provided with a plurality of coil portions electrically connectable relative to each other to provide speed ratios and electrical relationships due to connections for a two-to-one pole ratio as disclosed herein as well as in a copending application Serial No. 178,803, Neyhouse et al., filed March 12, 1962, now Patent 3,211,982, Neyhouse et al., dated October 12, 1965, belonging to the assignee of the present invention, as a division of original application Serial No. 804,223, Neyhouse et al., filed April 6, 1959, noted previously. For additional teaching as well as coverage of more than 2 to 1 ratio and 4 to 6 pole ratio operations avaliable in a dynamoelectric machine reference can be made to a disclosure of a copending patent application Ser. No. 804,374, now Patent 2,989,654, Neyhouse et al., issued June 20, 1961, to the assignee of the present invention.

In the copending application Ser. No. 804,374, now Patent 2,989,654, there is a disclosure related to a four-six pole dynamoelectric machine having a single winding including coil portions one through twelve which are fitted into slots of a stator assembly in two or more layers such that a double overlapping of ends of the coil portions occurs relative to each other and electrical poles are defined by summation of flux forces induced by flow of electrical current in conducting material of all of the coil portions at all times.

A single winding having only four concentric wound coil portions is illustrated in FIGURE 1. The coil portions as mentioned earlier are identified by Roman numerals I, II, III and IV in FIGURE 1. Coil portion I, for example, is formed to be located deep or radially outwardly in slots 1 and 16. The span of each of the coil portions in the embodiment of FIGURE 1 is equivalent to the arcuate distance between slots 1–16. Each of the coil portions in the embodiment of FIGURE 1 includes a total of six concentric sub-portions. It is to be noted that the coil portions I, II, III and IV are alternately located in positions radially inwardly and radially outwardly relative to the slots per se. As indicated above, more than four coil portions can be provided. A total of six leads can be brought out from the four elements in the embodiment of FIGURE 1. The stator for the embodiment of FIGURE 1 has thirty-two slots and the coil portions of the single winding are adapted to be connected as a nonreversible two-four pole motor.

Each of the coil portions of the single winding is formed using a #20 wire size including thirteen turns per sub-portion of each of six sub-portions forming each coil portion. All conducting material of all portions or branches of all elements is active at all times. It is to be understood that the wire size used for winding parallel portions of each of the coil portions II and IV need not be the same and then further modification of the starting torque is available.

FIGURE 2 illustrates use of parallel wound coil portions such as identified by Roman numerals I, II, III and IV in the veiw of FIGURE 1 now considered particularly for starting a motor in accordance with the present invention. In FIGURE 2 each of the coil portions has parallel wound conductor sub-portions specifically identified by letters A and B associated with coil portions I, II, III and IV. In the embodiment of FIGURE 2, parallel wound conductor sub-portions A and B of each of the coil portions are connected in series. Also, coil portion I has conductor sub-portions I–A and I–B connected in series with parallel wound conductor sub-portions III–A and III–B of coil portion III. Similarly, parallel wound conductor sub-portions II–A and II–B of coil portion II are connected in series with sub-portions IV–A and IV–B of coil portion IV. Thus, coil portions I and III are in series with each other to form north and south polarities, respectively, while coil portions II and IV are in series with each other also to form north and south polarities. It is to be understood that the embodiment of FIGURE 2 illustrates two pole starting and thus a phase shifting means or capacitance indicated by numeral 52 is connected in series through a centrifugal switch arm 56s. The leads are provided such that the phase shifting means 52 can be connected in parallel relative only to sub-portions II–B and IV–A. It is to be understood that different wire sizes can be used for the sub-portions of each of the coil portions wound in parallel with respect to each coil portion and thus further modification of starting torque can be obtained. Coil portions I–III and II–IV can have individual sub-portions of each in series with each other but the overall connection must be in parallel as shown in FIGURE 2 so as to obtain angular difference in currents in at least two portions of a pair of differing coil portions for phase shift necessary to obtain starting torque. Once the centrifugal switch operates, the motor in accordance with the present invention can run at the same number of poles as used for starting. A two pole high single speed operation is thus obtained.

The embodiment of FIGURE 2 showing connection for single speed starting and running is adaptable to multi-speed running operation by addition of switching means to effect reversal of connections in coil portions II and III. For details of such operation, reference is made to copending disclosures noted previously.

Similar winding and connection techniques can be applied to generators in order to achieve operation with more than one number of poles.

While the embodiments of the present invention as herein disclosed constitute preferred forms, it is to be understood that other forms might be adopted.

What is claimed is as follows:

1. A motor winding arrangement electrically energized by a power source for starting and running operation with a predetermined number of electrical poles on a magnetic stator core, comprising, plural coil portions each identified arbitrarily by Roman numbers I, II, III and IV each having at least a pair of conductor sub-portions physically in parallel as wound to be identified arbitrarily by references I-A and I-B, II-A and II-B, III-A and III-B, and IV-A and IV-B, said sub-portions having predetermined series connection to each other electrically as grouped as to each other to include four each thereof in a sequence identified by reference I-A, I-B, III-A, III-B in series, and correspondingly in a sequence identified by references II-A, II-B, IV-A, IV-B in series respectively, at least four of said sub-portions thus having collective series electrical energization for each grouping though said groupings collectively are electrically in parallel with each other, normally-closed centrifugal switching means having one of contact ends thereof connected at juncture between a pair of said series connected sub-portions such as identified by references IV-A and IV-B, and a phase shifting means connected in series between another contact end of said centrifugal switching means and juncture between another pair of said series connected sub-portions such as identified by references II-A and II-B for phase shift starting subject to opening of said centrifugal switching means at predetermined motor speed value to continue running operation using said sub-portions of said coil portions of both groupings all fully active and electrically energized at all times, said sub-portions of coil portions identified by references I-A, I-B and II-A, II-B each defining an electrical pole of N north polarity and said sub-portions of coil portions identified by references III-A, III-B and IV-A, IV-B each defining an electrical pole S south polarity.

2. In a dynamoelectric machine having a magnetic stator core with multiple slots and a plurality of individual winding coil portions fitted in predetermined locations as to said slots thereby only to provide a single stator winding electrically to define at least four poles and to be totally active during starting as well as running operation, the improvement which comprises having conductor sub-portions physically in parallel as wound for each of said winding coil portions all of predetermined wire size, said conductor sub-portions of odd-numbered poles all having series connection electrically to each other into a path in parallel collectively and electrically with remaining conductor sub-portions of even-numbered poles also all correspondingly having series connection electrically to each other, and switching means as well as a phase shifting means therewith that is removably connected electrically to parallel only at least one pair of series-connected sub-portions in one path during starting only, all of said conductor sub-portions of said single winding being totally active purposely at all times during starting as well as running operation.

3. In a dynamoelectric machine having a stator means including a magnetic core with multiple slots as well as only a single stator winding having at least four individual coil portions totally active electrically at all times, the improvement which comprises specific conductor sub-portions of differing wire size physically in parallel as wound for each of said coil portions of said single stator winding, each of said conductor sub-portions having series connection electrically to each other though coil portions of alternate poles are also connected in series in an arrangement of grouping of at least four sub-portions in each of separate though electrically parallel corresponding paths of energization, and switching means as well as a phase shifting means therewith that is removably connected electrically to parallel only at least one pair of series-connected sub-portions so as to obtain angular difference in electrical current energization in at least two sub-portions of a pair of differing coil portions for phase shift necessary to obtain starting torque in only one grouping of said series-connected sub-portions of said single stator winding totally active purposely at all times during starting as well as running operation.

References Cited by the Examiner

UNITED STATES PATENTS

| | | | |
|---|---|---|---|
| 2,606,311 | 8/1952 | Burian | 318—220 |
| 2,813,239 | 11/1957 | La Cour | 318—224 X |
| 2,817,050 | 12/1957 | La Cour | 318—224 X |
| 3,031,606 | 4/1962 | Cantonwine | 318—220 X |
| 3,068,389 | 12/1962 | Cantonwine | 318—220 |

ORIS L. RADER, *Primary Examiner.*

C. E. ROHRER, G. Z. RUBINSON, *Assistant Examiners.*